Patented Aug. 30, 1949

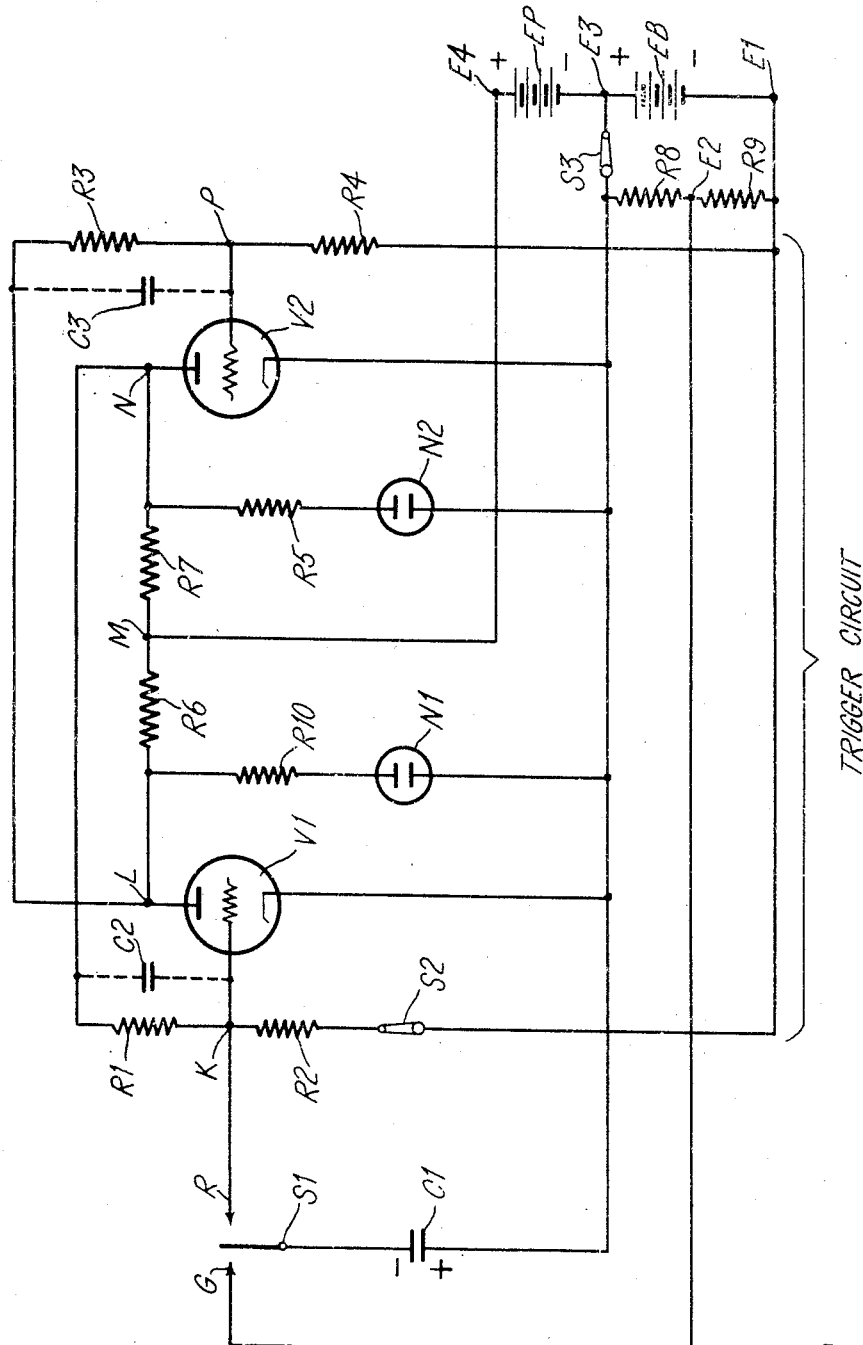

2,480,795

UNITED STATES PATENT OFFICE 2,480,795

CAPACITOR REGENERATOR

John L. Wagner, Endwell, and Robert E. Lawhead, Vestal, N. Y., assignors to International Business Machines Corporation, New York, N. Y., a corporation of New York Application March 29, 1948, Serial No. 17,668

9 Claims. (Cl. 320—1)

This invention relates to charging and discharging of electrical capacitors wherein a charge is utilized to regenerate a like charge.

It is frequently desirable to provide a means for storing electrical impulses. In electrical accounting machines, for example, electrical impulses are produced by sensing perforations in a record card to be utilized by comparing with other impulses similarly produced at a different time. Conventional ways of storing impulses of this nature are by energizing and holding electromagnetic relays or by energizing electron tubes. These methods are costly and somewhat complicated. A further method for storing electrical impulses is by charging a condenser. In this method, however, the impulse may be lost due to the gradual leaking away of the charge over the leakage paths provided by the condenser and its connecting conductors. Since it is frequently desirable also to utilize the stored impulse repeatedly, the condenser stored impulse may be lost after its first use due to the full condenser charge being required to manifest a proper comparison.

The principal object of the present invention is to provide a simple and economical capacitor storage device having means for precisely regenerating the charge periodically to compensate for normal leakage.

Another object of the invention is to provide a condenser storage device wherein the charge is precisely regenerated at the time it is utilized.

Other objects of the invention will be pointed out in the following description and claims and illustrated in the accompanying drawings, which disclose, by way of example, the principle of the invention and the best mode, which has been contemplated of applying that principle.

In the drawing an electrical circuit is shown embodying the invention, wherein a condenser C—1 is arranged to be initially charged through a switch S—1 by means of a voltage divider represented by a pair of resistors R—8 and R—9 which are energized by a battery E—B. The condenser C—1 is thereafter applied to operate a modified trigger circuit of a type commonly referred to as an Eccles-Jordan trigger circuit.

In order to illustrate the operation of the invention in terms of the circuit shown in the drawing, reference is made to actual values of current and potential derived from the circuit parameters hereinafter listed. These values are only exemplary, and are in no way to be construed as the only values by which the invention may be defined in operation.

In the circuit of the drawing let it be assumed that as a result of batteries E—P and E—B the value of potential at E—1 is zero, 65 volts at E—2 (positive with respect to E—1), 100 volts at E—3 (positive with respect to E—1), and 250 volts at E—4 (positive with respect to E—1). Consequently, when the single pole double throw switch S—1 is thrown to the contact G, the condenser C—1 will be charged to 35 volts, i. e., the difference between E—2 and E—3, with a polarity of charge as indicated (top plate negative and bottom plate positive). The switch S—1 is moved to a neutral position thereafter, the charge remaining on the condenser C—1.

Now referring to the trigger circuit proper in the drawing, opening of a switch S—2 will throw a positive potential of approximately 150 volts (difference between E—3 and E—4) on the grid of a vacuum tube V—1 rendering that tube conductive. When the switch S—2 is closed a circuit is established from E—4, through a terminal M, a resistor R—7, a terminal N, a resistor R—1, a terminal K, a resistor R—2, switch S—2, to E—1 causing approximately .6 m. a. to flow. Voltage drops are then established as follows: 119 volts in R—1, 119 volts in R—2, and 12 volts in R—7. The terminal K consequently is maintained at 119 volts (positive with respect to E—1) so that the grid of tube V—1 is maintained at plus 19 volts with respect to its cathode (the latter being at a potential of positive 100 volts (E—3) with respect to E—1) and the tube V—1 remains conductive with approximately 5.4 m. a. flowing in its anode circuit.

When the tube V—1 is not conducting a terminal P connected with the grid of a tube V—2, the other member of the trigger pair, is maintained at a potential of 119 volts (positive with respect to E—1) in a manner similar to that respecting the terminal K via a voltage drop in a resistor R—4 produced by a current of approximately .6 m. a. flowing in a circuit established as follows: E—4, terminal M, a resistor R—6, a terminal L, a resistor R—3, terminal P, resistor R—4, to E—1. Since the cathode of the tube V—2 is maintained at a potential of 100 volts (positive with respect to E—1), a positive potential of 19 volts also is maintained on the grid of the tube V—2. Since the tube V—1 is conducting, however, the current flowing in the resistor R—6 is approximately 6 m. a., and hence the voltage drop in resistor R—6 is approximately 120 volts and the potential of terminal L is 130 volts (positive with respect to E—1). Since the resistors R—3 and R—4 are equal, each has a voltage drop of approximately 65 volts and the terminal P is therefore at a potential of 65 volts (positive with respect to E—1) or at a potential of 35 volts negative with respect to E—3 which is the cathode potential of V—2. Consequently, V—2 will not conduct when V—1 conducts since the potential on the grid of V—2 is 35 volts negative with respect to its cathode.

The condenser C—1 has been charged with a potential of approximately 35 volts; however, some of the charge may have leaked off and its voltage may be reduced. Let it be assumed that the switch S—1 is operated to close with a contact R which is connected with the terminal K and the grid of tube V—1. Assuming that none of the charge has leaked off the condenser C—1, the potential of terminal K momentarily is reduced to a negative value (with respect to its cathode) of 16 volts (35 volts less 19 volts), and consequently the grid potential of V—1 is reduced so that V—1 is rendered non-conductive. The potential of terminal L immediately rises to approximately 238 volts thereby increasing the voltage drops across R—3 and R—4, respectively, to a value of 119 volts each, and the terminal P, and the grid of tube V—2, assumes a potential of 119 volts (positive with respect to E—1). The tube V—2 therefore becomes conductive since its grid receives a positive potential of 19 volts with respect to its cathode. Anode current flows in V—2 with a value of approximately 5.4 m. a. and the voltage drop in resistor R—7 is increased from 12 volts, as previously explained, to approximately 120 volts. The potential of terminal L is thereby reduced from 238 volts to 130 volts (positive with respect to E—1), and the drop in each resistor R—1 and R—2 is reduced to 65 volts so that the potential of terminal K is 65 volts (positive with respect to E—1). The condenser C—1 is therefore charged to a potential equal to the difference between that of terminal K and E—3, i. e., 100 volts—65 volts, or 35 volts with the same polarity as it was originally charged by the switch S—1 being thrown to contact G. In other words, the charge on condenser C—1 is precisely regenerated. By returning the switch S—1 to its normal, neutral position the charge will be retained on condenser C—1 subject to leakage conditions as heretofore related. The opening of switch S—2 will cause the trigger circuit to transfer, i. e., tube V—1 will again become conductive and V—2 non-conductive, as previously described, and the closing of switch S—2 thereafter will place the circuit in a condition for further regenerating the condenser charge. It is obvious that timed mechanically operated switches or cam operated contacts may be substituted for the switches S—1 and S—2 in a manner commonly employed in electrical accounting machines.

A neon tube N—1 with a series resistor R—10 is connected across the anode-cathode circuit of tube V—1 and a similar neon tube N—2 with a resistor R—5 is connected across the anode-cathode circuit of tube V—2 for indicating the conditions of the trigger tubes, i. e., N—1 glows when V—2 is conductive and is dark when V—1 is conductive, while N—2 glows when V—1 is conductive and is dark when V—2 is conductive. Means is thereby furnished for indicating the presence of a charge on a condenser such as C—1. It is obvious that well known types of gas triodes connected in the same manner might be substituted for operating electromechanical means as indications of the trigger tube conditions and of the presence of charges on the condenser C—1.

As an example of the feature of the invention just discussed, let it be assumed that a condenser C—1 is to be tested to determine whether a charge is present indicative of a stored impulse. The test is to be made, however, to indicate the presence of the impulse in storage without destroying the same for a future use. Let C—1 be charged by operation of S—1 to contact G. S—2 is opened, whereupon N—2 glows and N—1 is dark, S—2 then being closed. S—1 is then moved against contact R. If C—1 is charged N—2 will become dark and N—1 will glow, indicating that a charge is present on C—1, at the same time, however, the charge upon C—1 is precisely regenerated, as may be proved by further tests in the manner just prescribed. The condenser C—1 may be discharged by moving S—1 to contact G and opening a switch S—3, normally closed, allowing any charge to leak off over resistor R—8, which serves normally as part of a voltage divider together with a resistor R—9 to produce the potential E—2. It is obvious from the foregoing description that an uncharged condenser C—1 will have no effect when applied to the conditioned trigger circuit, i. e., N—2 will continue to glow and N—1 to remain dark as an indication of the absence of the charge.

It can be readily understood that, depending upon the characteristics of the vacuum tubes V—1 and V—2 and the circuit constants, the potential remaining on C—1 need not be as great as 35 volts or a grid swing of 16 volts (negative) applied to the grid of V—1, as previously explained. It was found that as little as 3.5 volts grid bias would serve to trip V—1 (render it non-conductive) with the arrangement and constants illustrated herein, provided the capacitors C—2 and C—3 (connected via dashed lines across R—1 and R—3 respectively) are used. In other words, the potential of C—1 may fall to 22.5 volts. The values of C—2 and C—3, however, must be relatively small in comparison with C—1 in order to keep the time delay effect reduced to a minimum. For this reason these condensers are eliminated unless exceedingly great storing times are desired. For example, using the circuit parameters indicated herein it has been found that an impulse can be stored in a condenser C—1 for the following periods of time:

| Condenser C-1 | Period of Storage |
| --- | --- |
| .001 mfd. standard mica | 5 minutes. |
| .01 mfd. standard mica | 15 hours. |
| .0003 mfd. special mica | 51 hours. |

Circuit parameters for the embodiment of the invention herein described are:

V—1 and V—2: RCA 6SN7
R—1, R—2, R—3, R—4: 200,000 ohms
R—5, R—10: 500,000 ohms
R—6, R—7, R—9: 20,000 ohms
R—8: 10,000 ohms
E—P: 150 volts
E—B: 100 volts
N—1, N—2: .1 watt G. E. Co. neon lamp
C—1: .001 mfd. std. mica (Note: C—2 and C—3 are omitted in the embodiment illustrated relative to values of potentials and currents discussed; however, values to .001 mfd. have been used successfully.)

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In combination, a trigger circuit comprising a pair of electron discharge devices having interconnected grid and anode electrodes, one said device being normally conductive, and a circuit to the said device including a precharged capacitor effective upon its discharge to energize the circuit to trip the said trigger, the tripping of the trigger transmitting a voltage through the said circuit to the said capacitor for restoring it to its precharged condition.

2. In combination with a control element of a normally conductive electron discharge device in a trigger circuit wherein said device is alternately conductive and non-conductive corresponding respectively to a stable and an active state of conductivity of the said circuit, the said element being susceptive to an electrical pulse whereby the state of electrical conductivity of the circuit is reversed, a precharged capacitor, and circuit connections including a connection between the capacitor and the said element to discharge the capacitor to produce a pulse to reverse the state of conductivity of the said circuit, the said reversal producing a voltage for restoring the said capacitor to its precharged condition by means of the said connection.

3. A pair of multi-electrode discharge devices having anode and grid elements regeneratively interconnected to form a trigger circuit, the said circuit having a stable state wherein one said device is normally conductive and the other normally non-conductive, and an active state reversing the said conductive states, an input circuit to an element of the normally conductive device, and a precharged capacitor discharged across the input circuit to furnish a voltage to effect a reversal of state of trigger conductivity whereby a voltage is produced and transmitted by way of the said circuit to regenerate the charge on the said capacitor.

4. A pair of electron discharge devices each having grid, anode, and cathode electrodes, impedances interconnecting the grids and anodes, impedances across the grid and cathode electrodes of each device together with a source of potential for biasing the said devices to produce a trigger circuit normally in one condition of electrical stability, and circuit means including a condenser having a predetermined charge for supplying a voltage to a said biasing impedance to produce another condition of electrical stability in the said circuit, the said circuit means being arranged to deliver a voltage from the said biasing impedance to the said condenser when the circuit stability is changed, sufficient to restore the charge on the said condenser precisely to its predetermined value.

5. A pair of electron discharge devices each having grid, anode, and cathode electrodes, impedances interconnecting the grids and anodes of the said devices, impedances together with a source of potential across the grid and cathode electrodes of each said device for providing biasing voltages to produce a trigger circuit having one state of electrical stability wherein one said device is conductive and the other is non-conductive and another state of stability in which the conductive conditions are reversed, indicating means comprising a gaseous discharge device connected to the anode of a conductive electron discharge device, and impulsing means including a capacitor having a predetermined charge for supplying a voltage to the grid electrode of said conductive electron discharge device to reverse the state of electrical stability of the said trigger circuit, the said impulsing means being arranged to deliver a voltage to the said capacitor from a said biasing means, when the stability of the said circuit reverses, sufficient to precisely regenerate the charge of the said capacitor to its predetermined value, the said indicating means manifesting the occurrence of the regenerations of the said charge.

6. The invention as set forth in claim 5, wherein the said indicating means is connected to the anode of a non-conductive electron discharge device.

7. In combination, a trigger circuit comprising a pair of electron discharge devices, having connections therebetween so that one said device is normally conducting and the other is normally non-conducting, and a precharged capacitor connected to the said devices and effective upon its discharge to initiate the tripping of the said trigger to render the said conducting device non-conducting and the said non-conducting device conducting wherefrom a voltage is provided through the said connections to restore the said capacitor to its precharged condition.

8. In an electrical circuit a pair of electron devices each having a plurality of electrodes and each device being capable of a conductive state and a non-conductive state, circuit connections including a source of potential interconnecting electrodes of the said devices for rendering one said device conductive whenever the other said device is rendered non-conductive, a precharged capacitor effective upon its discharge to render the conductive one of said devices non-conductive, and other circuit connections from the said capacitor to electrodes of the conductive one of said devies for applying the potential of the said capacitor to render the said device non-conductive, whereby the charge on the capacitor is precisely restored through the said connections by a voltage pulse from the other said device becoming conductive.

9. In an electrical circuit a pair of electron devices each having a plurality of electrodes and each device being capable of a conductive state and a non-conductive state, circuit connections including a source of potential interconnecting electrodes of the said devices for rendering one said device non-conductive whenever the other said device is rendered conductive, a precharged capacitor effective upon its discharge to render the non-conductive one of the said devices conductive, and other circuit connections from the said capacitor to electrodes of the said devices for applying the potential of the capacitor to render the non-conductive one of the devices conductive, wherefrom a voltage is derived and transmitted through the said connections to precisely restore the charge upon the said capacitor.

JOHN L. WAGNER.
ROBERT E. LAWHEAD.

REFERENCES CITED

The following references are of record in the file of this patent:

UNITED STATES PATENTS

| Number | Name | Date |
| --- | --- | --- |
| 2,269,460 | Klemperer | Jan. 13, 1942 |
| 2,278,431 | Klemperer | Apr. 7, 1942 |
| 2,378,897 | Burgwin | June 26, 1945 |
| 2,390,774 | Burgwin et al. | Dec. 11, 1945 |